United States Patent [19]
Liang

[11] Patent Number: 5,839,248
[45] Date of Patent: Nov. 24, 1998

[54] FRAME ASSEMBLY

[76] Inventor: Rui-Wen Liang, 58, Ma Yuan West St., Taichung, Taiwan

[21] Appl. No.: 779,285

[22] Filed: Dec. 16, 1996

[51] Int. Cl.⁶ .................................. E04B 1/38; F16B 7/00
[52] U.S. Cl. ..................... 52/655.2; 312/140; 312/265.3; 403/171; 403/176
[58] Field of Search .................................... 403/174, 178, 403/176, 171; 52/81.3, 655.1, 655.2; 312/108, 111, 140, 265.1, 265.2, 265.3, 265.4, 265.6; 446/120, 121, 126

[56] References Cited

U.S. PATENT DOCUMENTS

2,799,118  7/1957  Lullo ....................................... 446/121
4,036,371  7/1977  Michel ..................................... 403/171
5,049,105  9/1991  Glickman ................................ 446/121

Primary Examiner—Michael Safavi

[57] ABSTRACT

A frame assembly which can be converted to various shapes to hold different articles. Inner and outer frame members are utilized with the inner frame member serving to hold a panel or flat plate thus forming an enclosure. The frame members are connected to joints to form the frame assembly. With each joint having a U-shaped plate housing a fastening element which attaches to each outer frame member in a snap fit relationship. A screw rod and adjusting bolt enable a detachable connection between the U-shaped plate and the fastening element. Dual fins of the fastening element behind corresponding protruded blocks lying within the outer frame to allow for connection between frame the fastening element.

5 Claims, 9 Drawing Sheets

FRAME ASSEMBLY

BACKGROUND OF THE INVENTION

The invention relates to a frame assembly. More particularly, the invention relates to a frame assembly which has a plurality of joints to join at least two outer frames.

A conventional frame assembly has a plurality of connected frames. Since the frames are connected by screws or nails, the frames cannot be disassembled. If the screws or nails are unscrewed or broken, the whole frame assembly will be collapsed.

SUMMARY OF THE INVENTION

An object of the invention is to provide a frame assembly which has a plurality of joints to join two or more outer frames.

Another object of the invention is to provide a frame assembly which can be converted to various shapes to hold different articles.

Accordingly, a frame assembly comprises a first outer frame, a second outer frame, a third outer frame, a fourth outer frame, a first inner frame, a second inner frame, a third inner frame, a fourth inner frame, a first joint, a second joint, a third joint, a fourth joint, and a flat plate. The flat plate is surrounded by the first inner frame, the second inner frame, the third inner frame, and the fourth inner frame. The first inner frame is inserted in the first outer frame. The second inner frame is inserted in the second outer frame. The third inner frame is inserted in the third outer frame. The fourth inner frame is inserted in the fourth outer frame. The first outer frame and the fourth outer frame are connected by the first joint. The second outer frame and the fourth outer frame are connected by the second joint. The second outer frame and the third outer frame are connected by the third joint. The first outer frame and the third outer frame are connected by the fourth joint. Each of the joints has a polyhedron body and a plurality of plugs connected to the polyhedron body. Each of the polyhedron bodies has a plurality of square faces. A plurality of inserted recesses are formed on each of the square faces of the polyhedron body. Each of the plugs has a U-shaped plate, a through hole, a plurality of apertures, a recess hole, a slot, and two inserting blocks. A fastening element is inserted in the slot. The fastening element has a screw rod, an adjusting bolt disposed on the screw rod, a first fin and a second fin connected to the screw rod, and a spring. The first fin has a first tip end. The second fin has a second tip end. The spring has a first hook end hooking the first end tip and a second hook end hooking the second end tip. The first fin has a first protruded portion connected to the screw rod. The second fin has a second protruded portion connected to the screw rod. A first rivet fastens the first fin in the plug. A second rivet fastens the second fin in the plug. The screw rod is inserted in the corresponding recess hole. The inserting blocks are inserted in the corresponding inserted recesses respectively. The adjusting bolt has a shank and an inserted tip inserted in a blind hole of the plug. Each of the inner frames has a main body, a plurality of inserted grooves, and a first lateral plate disposed on the main body. A second lateral plate has a protruded plate inserted in one of the inserted grooves.

DETAILED DESCRIPTION OF THE INVENTION

Referring to FIGS. 1 to 9, a frame assembly comprises a first outer frame 20, a second outer frame 20, a third outer frame 20, a fourth outer frame 20, a first inner frame 30, a second inner frame 30, a third inner frame 30, a fourth inner frame 30, a first joint 10, a second joint 10, a third joint 10, a fourth joint 10, and a flat plate 70. The flat plate 70 is surrounded by the first inner frame 30, the second inner frame 30, the third inner frame 30, and the fourth inner frame 30. The first inner frame 30 is inserted in the first outer frame 20. The second inner frame 30 is inserted in the second outer frame 20. The third inner frame 30 is inserted in the third outer frame 20. The fourth inner frame 30 is inserted in the fourth outer frame 20. The first outer frame 20 and the fourth outer frame 20 are connected by the first joint 10. The second outer frame 20 and the fourth outer frame 20 are connected by the second joint 10. The second outer frame 20 and the third outer frame 20 are connected by the third joint 10. The first outer frame 20 and the third outer frame 20 are connected by the fourth joint 10.

Figure 1:
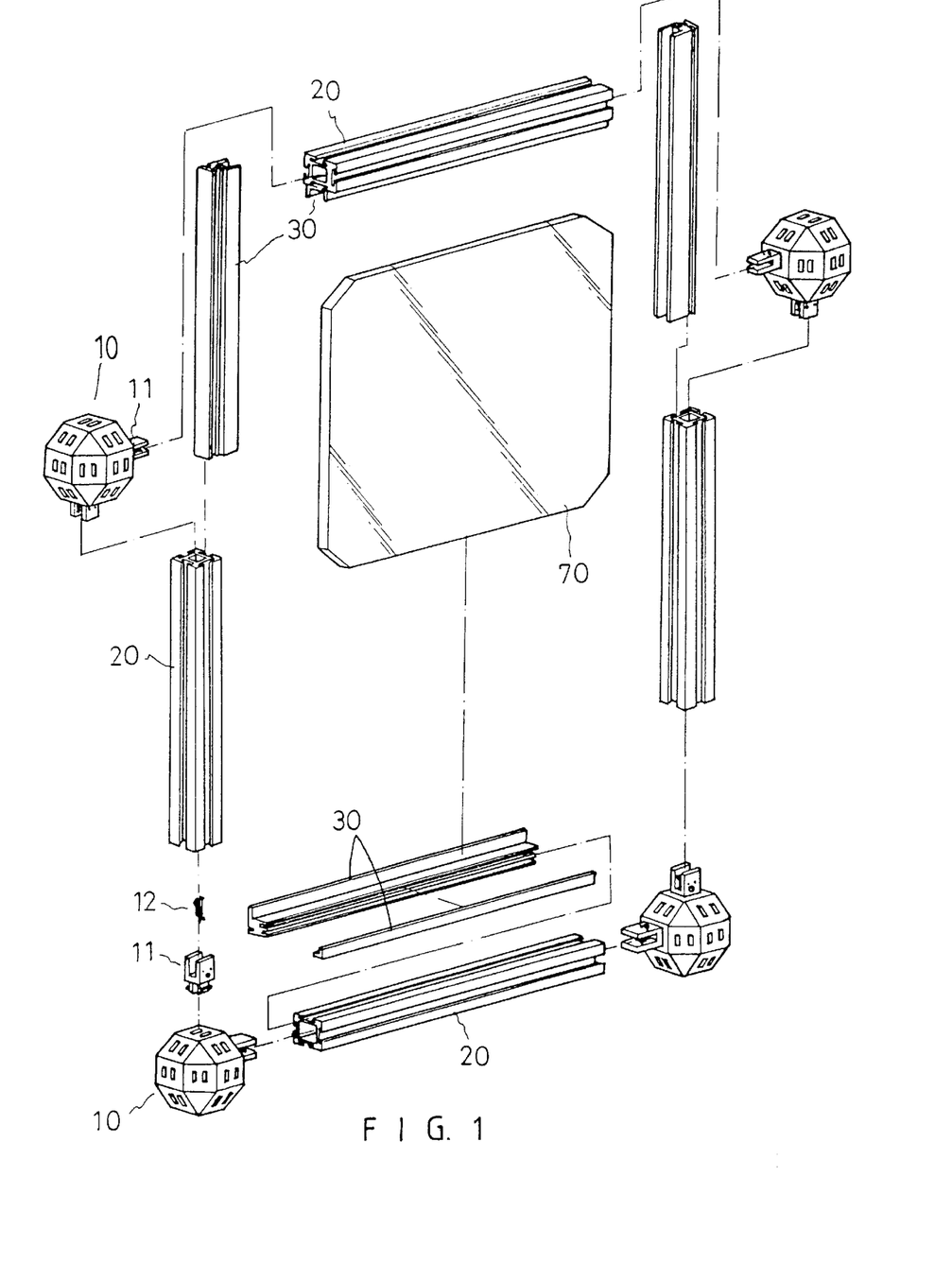
FIG. 1 is a perspective exploded view of a frame assembly of a first preferred embodiment in accordance with the invention.
Figure 2:
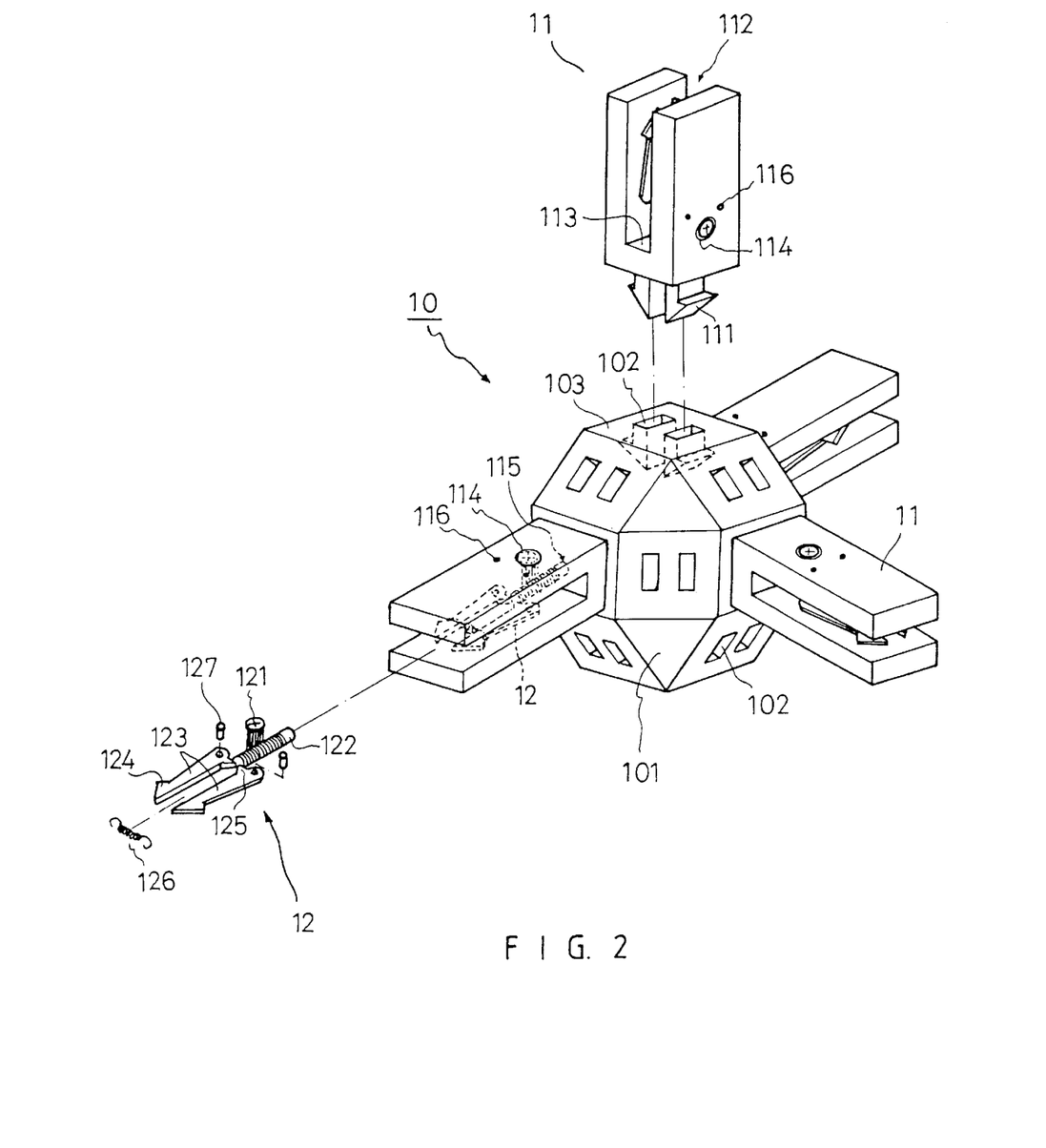
FIG. 2 is a perspective view of a joint.

Each joint 10 has a polyhedron body 101 and a plurality of plugs 11 connected to the polyhedron body 101. Each polyhedron body 101 has a plurality of square faces 103. A plurality of inserted recesses 102 are formed on each square face 103 of the polyhedron body 101.

Figure 3:
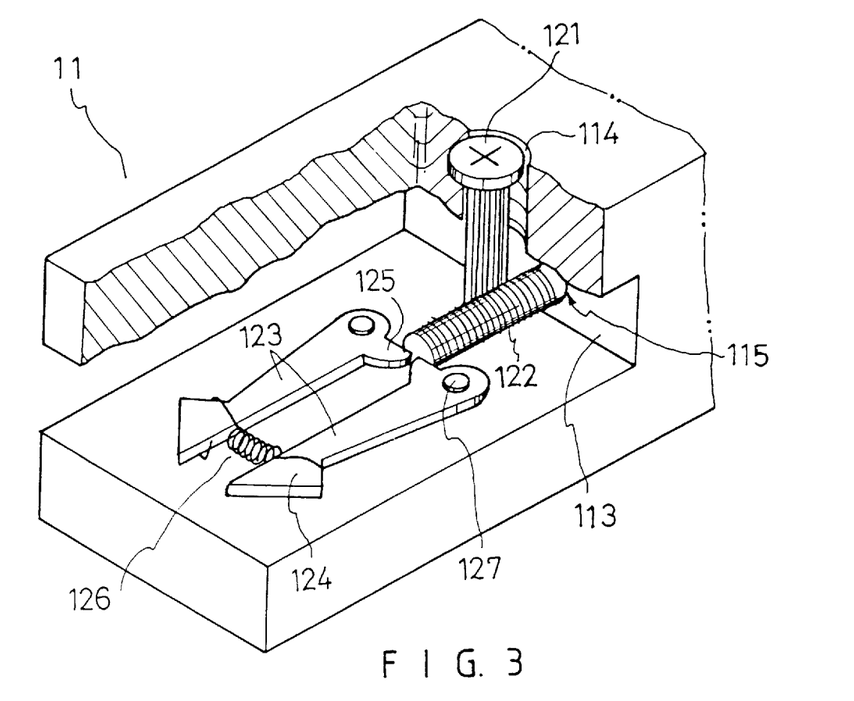
FIG. 3 is a partially sectional view of a plug.
Figure 4:
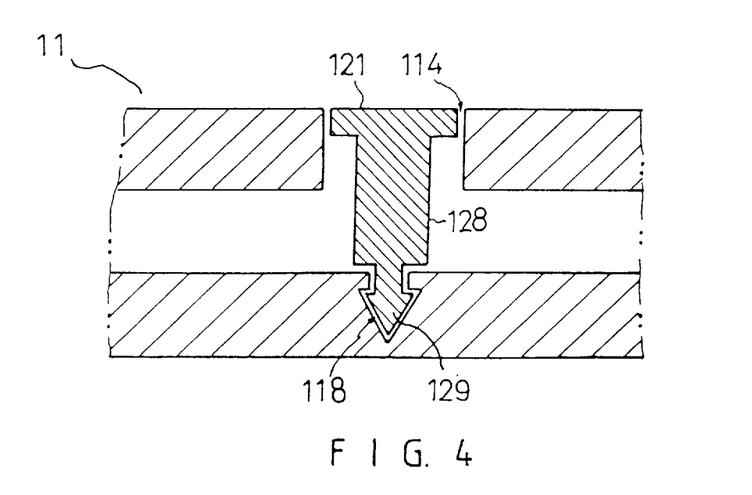
FIG. 4 is a sectional view of a plug.

Each plug 11 has a U-shaped plate 113, a through hole 114, a plurality of apertures 116, a recess hole 115, a slot 112, and two inserting blocks 111. A fastening element 12 is inserted in the slot 112. The fastening element 12 has a screw rod 122, an adjusting bolt 121 disposed on the screw rod 122, a first fin 123 and a second fin 123 connected to the screw rod 122, and a spring 126. The first fin 123 has a first tip end 124. The second fin 123 has a second tip end 124. The spring 126 has a first hook end hooking the first end tip 124 and a second hook end hooking the second end tip 124. The first fin 123 has a first protruded portion 125 connected to the screw rod 122. The second fin 123 has a second protruded portion 125 connected to the screw rod 122. A first rivet 127 fastens the first fin 123 in the plug 11. A second rivet 127 fastens the second fin 123 in the plug 11. The screw rod 122 is inserted in the corresponding recess hole 115. The inserting blocks 111 are inserted in the corresponding inserted recesses 102 respectively. The adjusting bolt 121 has a shank 128 and an inserted tip 129 inserted in a blind hole 118 of the plug 11.

Figure 6:
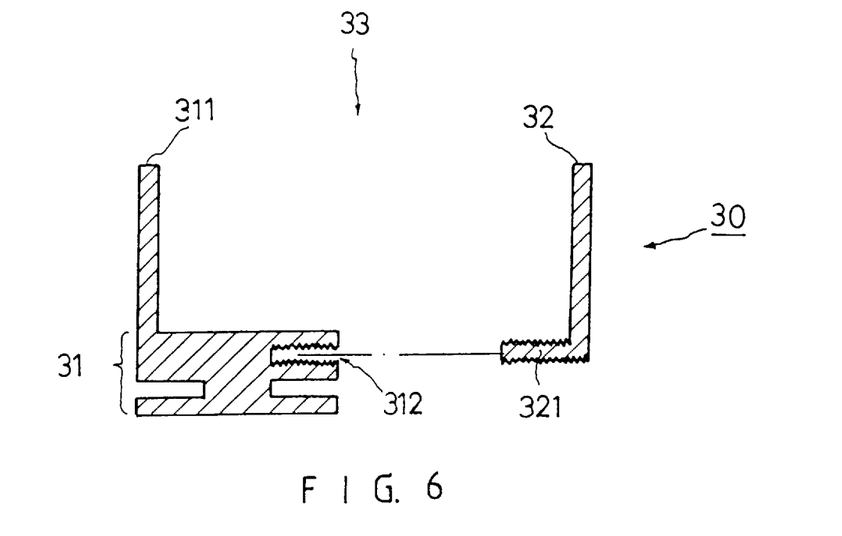
FIG. 6 is a sectional view of an inner frame.

Each of the inner frames 30 has a main body 31, a plurality of inserted grooves 312, and a first lateral plate 311 disposed on the main body 31. A second lateral plate 32 has a protruded plate 321 inserted in one of the inserted grooves 312.

Figure 5:
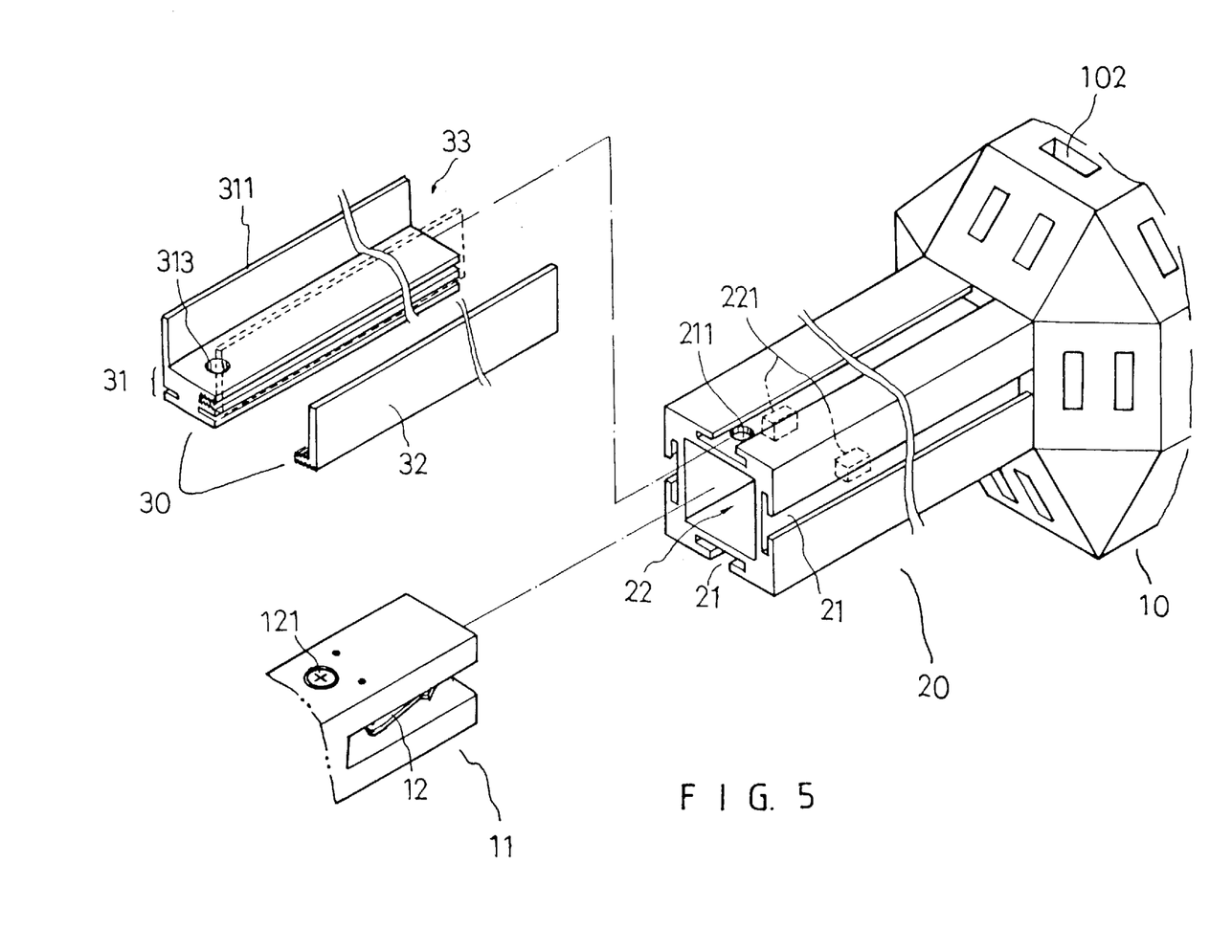
FIG. 5 is a partially perspective view illustrating a combination of a joint, an inner frame and an outer frame.
Figure 7:
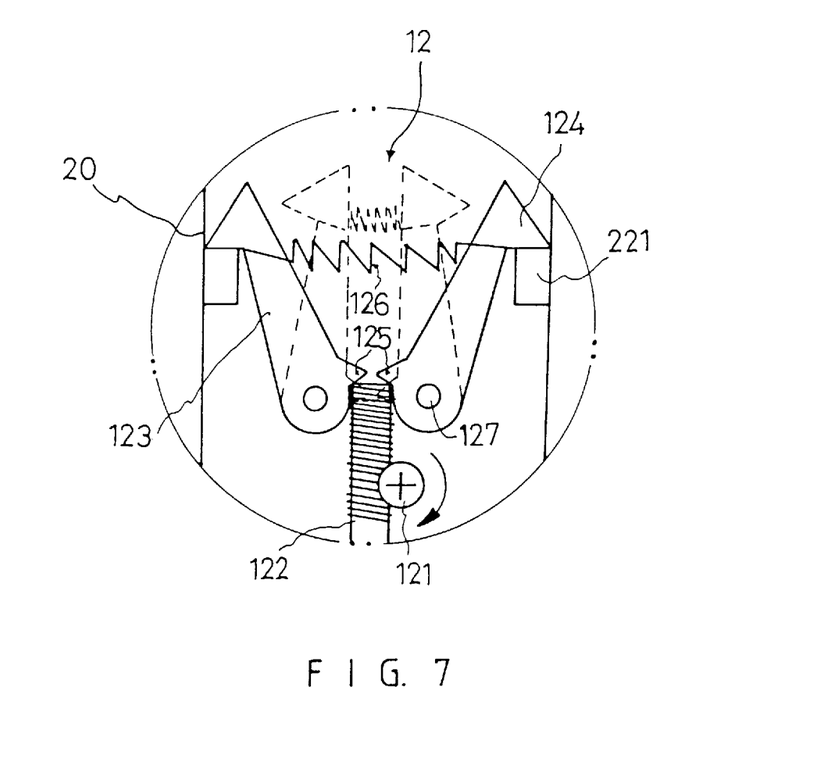
FIG. 7 is a partially schematic view illustrating an operation of two fins.
Figure 8:
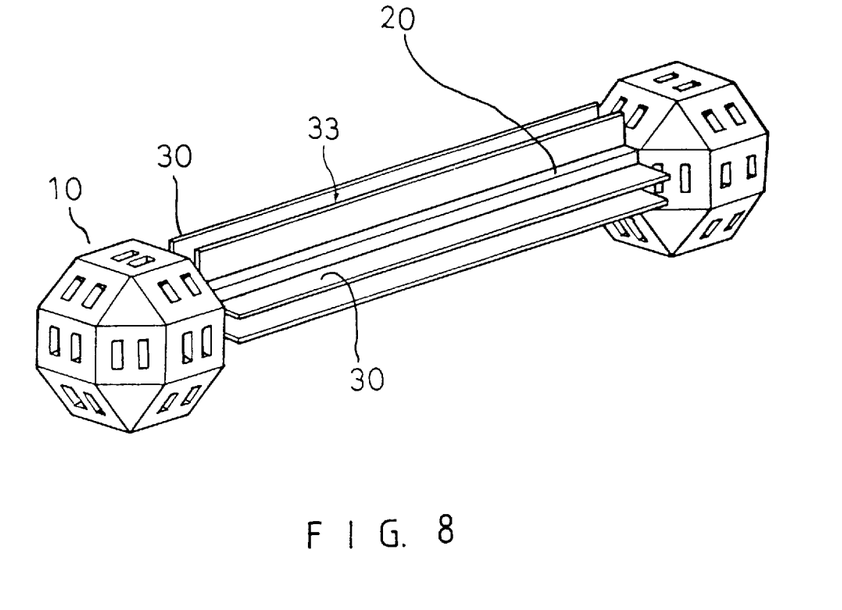
FIG. 8 is a perspective assembly view of an inner frame, an outer frame and two joints.
Figure 9:
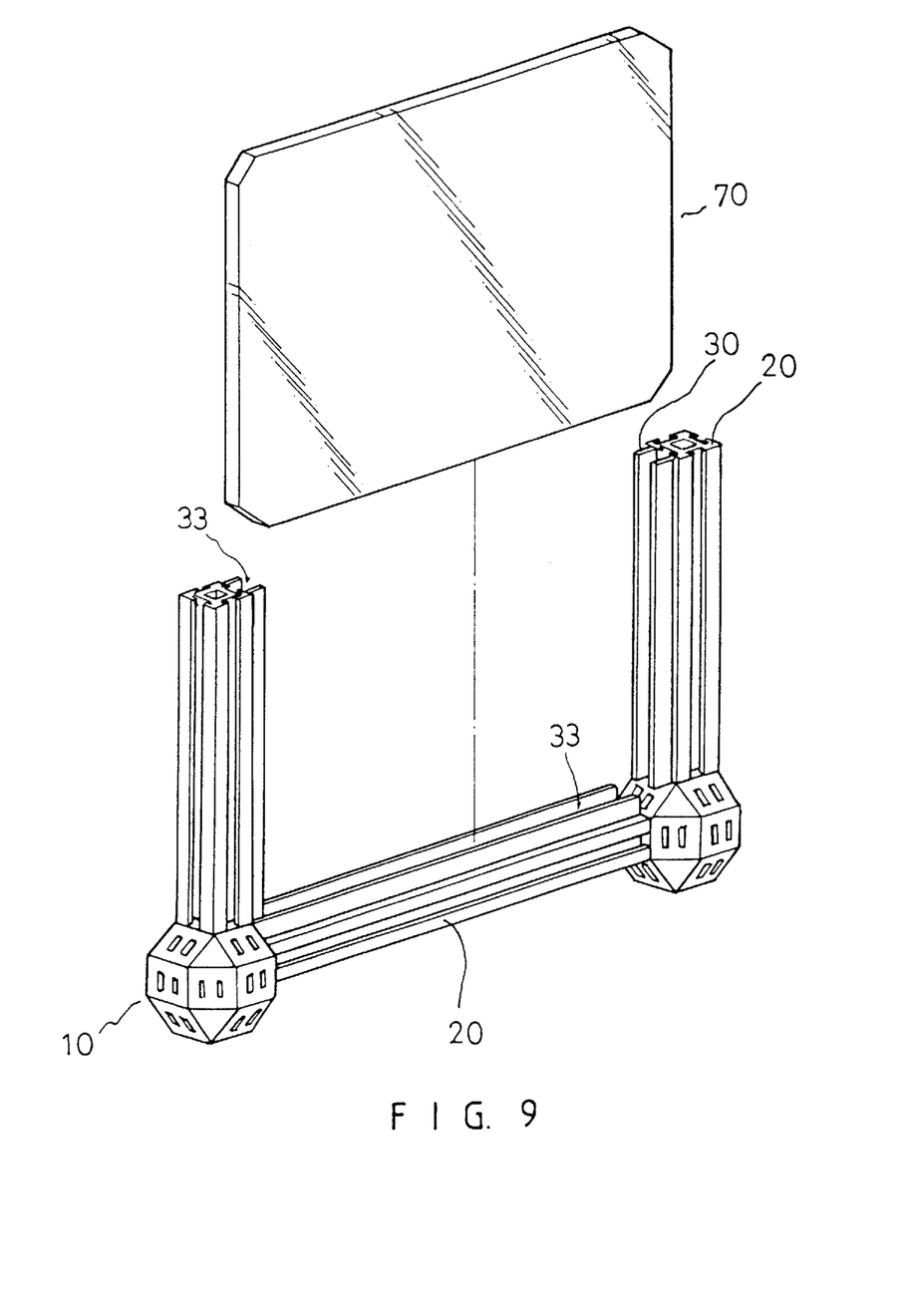
FIG. 9 is a perspective view of a frame assembly of a first preferred embodiment in accordance with the invention.

Referring to FIGS. 7 and 5, a plurality of protruded blocks 221 are disposed in each of the outer frames 20. The plug 11 engages with the corresponding outer frame 20 and the tip ends 124 are blocked by the corresponding protruded blocks 221.

Figure 10:
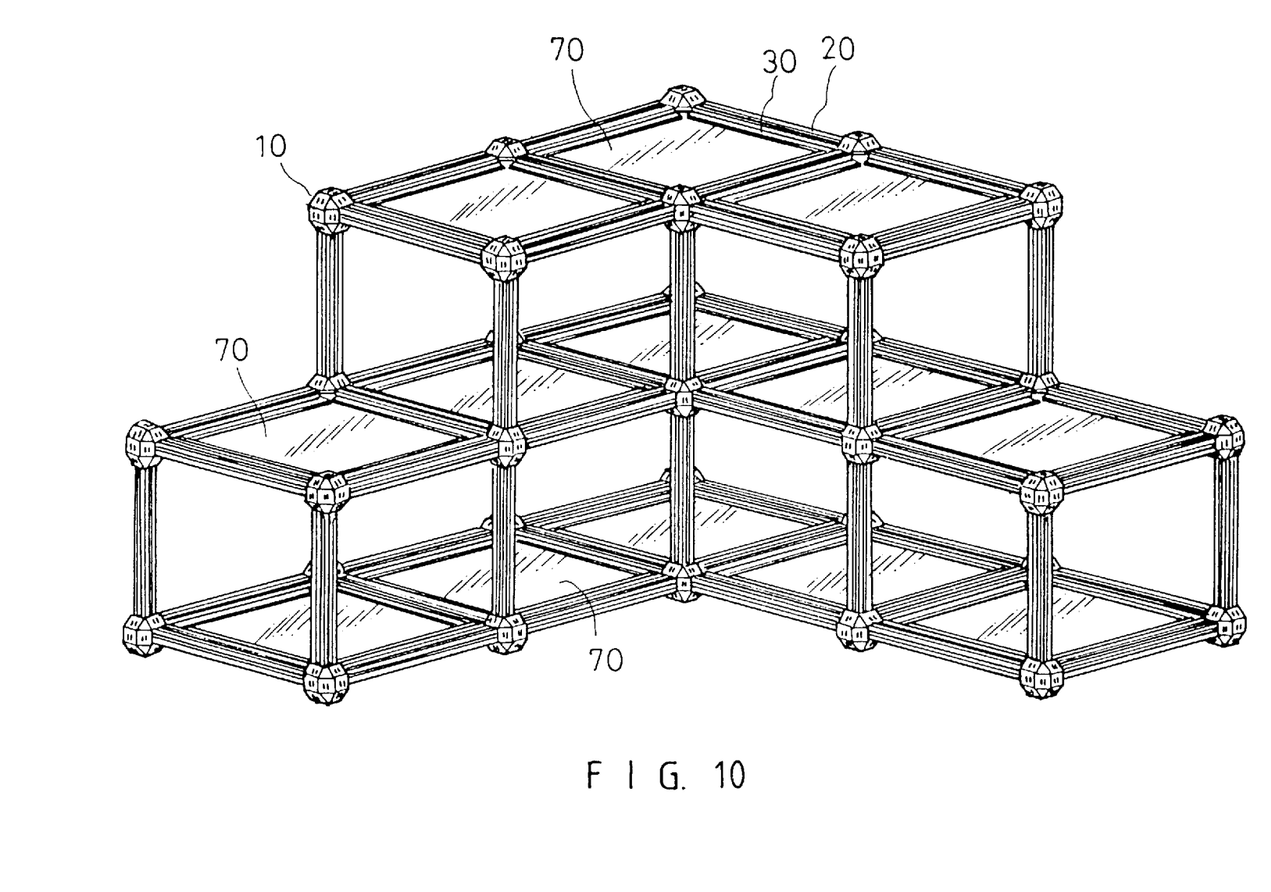
FIG. 10 is a perspective assembly view of a second preferred embodiment in accordance with the invention.

Referring to FIG. 10, a frame assembly contains a plurality of cubic compartments.

Figure 11:
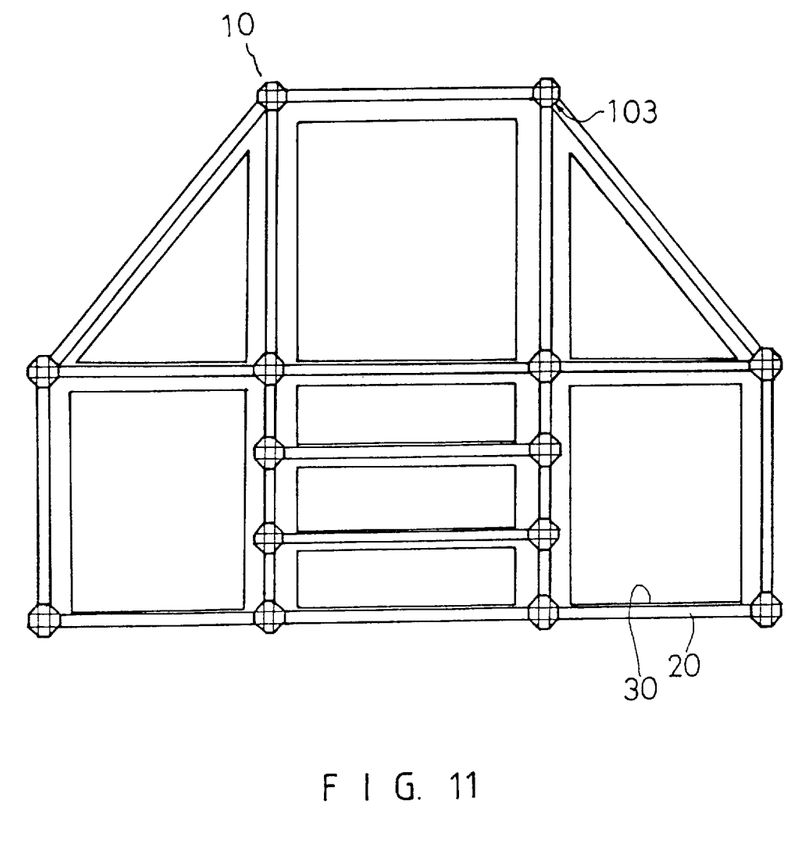
FIG. 11 is an elevational view of a third preferred embodiment in accordance with the invention.

Referring to FIG. 11, a frame assembly has a house shape.

The invention is not limited to the above embodiment but various modification thereof may be made. Further, various changes in form and detail may be made without departing from the scope of the invention.

I claim:

1. A frame assembly comprising:
   at least a first outer frame, a second outer frame, a third outer frame, a fourth outer frame, a first inner frame, a second inner frame, a third inner frame, a fourth inner frame, a first joint, a second joint, a third joint, a fourth joint, and a flat plate,
   the flat plate surrounded by the first inner frame, the second inner frame, the third inner frame, and the fourth inner frame,
   the first inner frame inserted in the first outer frame, the second inner frame inserted in the second outer frame, the third inner frame inserted in the third outer frame, and the fourth inner frame inserted in the fourth outer frame,
   the first outer frame and the fourth outer frame connected by the first joint, the second outer frame and the fourth outer frame connected by the second joint, the second outer frame and the third outer frame connected by the third joint, and the first outer frame and the third outer frame connected by the fourth joint, each of the joints having a polyhedron body and a plurality of plugs connected to the polyhedron body, each of the polyhedron bodies having a plurality of square faces, a plurality of inserted recesses formed on each of the square faces of the polyhedron body, each of the plugs having a U-shaped plate, a through hole, a plurality of apertures, a recess hole, a slot, and two inserting blocks, a fastening element inserted in the slot, the fastening element having a screw rod, an adjusting bolt disposed on the screw rod, a first fin and a second fin connected to the screw rod, and a spring, the first fin having a first tip end, the second fin having a second tip end, the spring having a first hook end hooking the first tip end and a second hook end hooking the second tip end, the first fin having a first protruded portion connected to the screw rod, the second fin having a second protruded portion connected to the screw rod, a first rivet fastening the first fin in the plug, a second rivet fastening the second fin in the plug, the screw rod inserted in the corresponding recess hole, and the inserting blocks inserted in the corresponding inserted recesses respectively.

2. A frame assembly as claimed in claim 1, wherein each of the inner frames has a main body, a plurality of inserted grooves, and a first lateral plate disposed on the main body, and a second lateral plate having a protruded plate inserted in one of the inserted grooves.

3. A frame assembly as claimed in claim 1, wherein each of the plugs has a blind hole.

4. A frame assembly as claimed in claim 3, wherein the adjusting bolt has a shank and an inserted tip inserted in a blind hole of the plug.

5. A frame assembly as claimed in claim 1, wherein a plurality of protruded blocks are disposed in each of the outer frames.

* * * * *